United States Patent [19]
Dighton et al.

[11] Patent Number: 5,182,870
[45] Date of Patent: Feb. 2, 1993

[54] SYSTEM AND METHOD FOR RECOVERING VOLATILE ORGANIC GASES EMITTED FROM A POLYETHYLENE RESIN PRODUCT

[75] Inventors: Gaylon L. Dighton; David G. Alvarez, both of Baton Rouge, La.

[73] Assignee: The Dow Chemical Company, Midland, Mich.

[21] Appl. No.: 575,453

[22] Filed: Aug. 30, 1990

[51] Int. Cl.⁵ .............................................. A26B 3/00
[52] U.S. Cl. ............................................ 34/26; 34/32; 34/79
[58] Field of Search .................. 34/32, 79, 72, 40, 86, 34/26

[56] References Cited
U.S. PATENT DOCUMENTS 3,728,797  4/1973  Worden, Sr. et al. .................. 34/32
4,073,063  2/1978  Gutjahr .................................... 34/32
4,942,676  7/1990  Wimberger ......................... 34/16 X

*Primary Examiner*—Henry A. Bennet
*Attorney, Agent, or Firm*—Dale H. Schultz

[57] ABSTRACT

The invention is a system and method for recovering volatile organic gases emitted by solid pellets of a polyetheylene resin product. In the process for making the resin product, the pellets are sampled for product quality and blended to obtain a more uniform mixture, before being transferred to shipping or storage containers. During this process gas must be purged from the sampler and blender vessels to prevent it from building up to an explosive level. In the purging step, outside air is blown through the blender and sampler vessels to mix with the organic gases therein, and this mixture is passed to a furnace, to provide combustion air for the furnace.

9 Claims, 2 Drawing Sheets 5,182,870

SYSTEM AND METHOD FOR RECOVERING VOLATILE ORGANIC GASES EMITTED FROM A POLYETHYLENE RESIN PRODUCT

BACKGROUND OF THE INVENTION

The invention relates broadly to a system and method for recovering volatile organic gases from polyethylene resin products.

DOWLEX ® polyethylene resins are linear low density compounds that are widely used today in the plastics industry. These compounds are usually made in the form of solid pellets. During the manufacturing process, the pellets are first moved into a check hopper, where samples are taken to analyze for product quality. After sampling, the pellets are transferred to a blender vessel, where different sizes are mixed to obtain a uniform mixture. The finished pellets are then sent to rail cars, drums, or other containers for shipping or storage.

Before the resin pellets enter the checking and blending operations, they can contain as much as 1200 ppm of volatile organic compounds, such as ethylene, isooctane, hexane, propane, or other hydrocarbon compounds, depending on the solvent carrier used in the process. These volatile organic compounds gradually diffuse to the surface of the pellets. As the pellets move through the check hopper and the blender vessel, therefore, the concentration of the gaseous compounds inside these vessels can reach explosive levels in a short time. To avoid this hazard, the gases are purged from the check hopper and blender vessel with air, which is vented directly into the atmosphere.

Since these volatile organic gases are considered as pollutants to the environment, discharging them into the atmosphere is not a satisfactory disposal method. The present invention overcomes this problem by providing a system for recovering and utilizing these gases.

SUMMARY OF THE INVENTION

The invention is directed to a system and method for recovering volatile organic gases emitted from solid pellets of a polyethylene resin product. In one embodiment of the invention, the system includes a group of sampler vessels and a group of blender vessels. The finished pellets are delivered from a product source to an empty sampler vessel. When the sampler vessel is full, the continuously moving pellet stream is diverted to another empty sampler vessel. The pellets in the full vessel are then sampled to analyze for product quality.

Following the sampling step, the pellets in the full vessel are conveyed to a blender vessel. In the blender vessel, pellets of different qualities are mixed together to obtain a uniform mixture. When the blender vessel is full, the pellet stream is diverted to another empty blender vessel. After mixing, the pellets in the full blender vessel are transferred to shipping or storage containers. As described herein, therefore, the sequence involves filling a sampler vessel with pellets, sampling these while another sampler vessel is filling, moving the pellets to a blender after sampling, mixing these pellets while another blender vessel is filling, and transferring the pellets from each blender vessel to shipping or storage containers.

As mentioned above, the pellets emit volatile organic compounds, in gaseous form, as they move through the system. To prevent the gas from reaching explosive levels in the sampler and blender vessels, air is blown through these vessels while the pellets are contained therein. The air mixes with the organic gases, and this gaseous mixture is vented to a furnace, to provide combustion air for the furnace. The furnace provides the heat necessary to operate the polymerization process.

DESCRIPTION OF THE INVENTION

Figure 1:
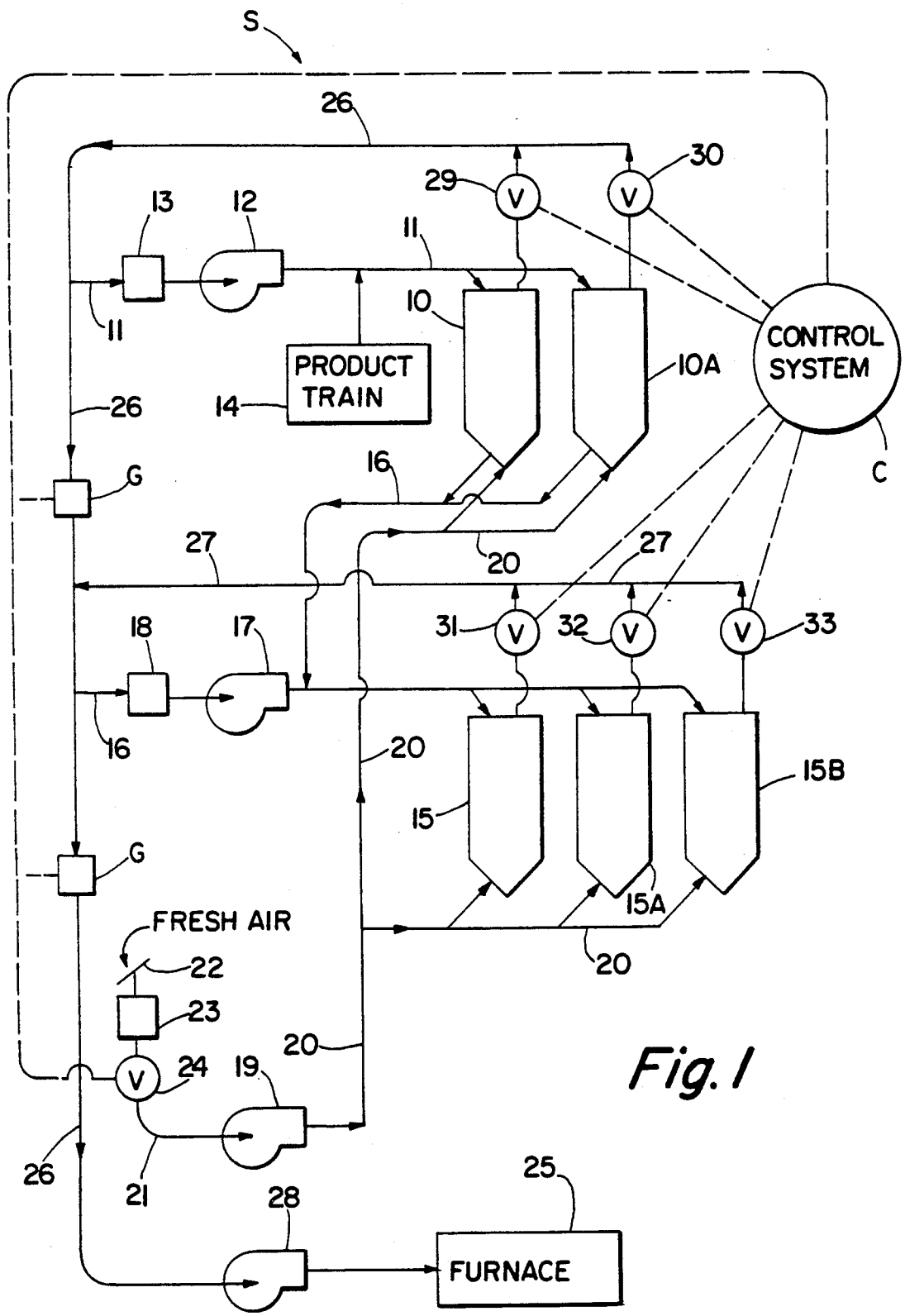
FIG. 1 is a schematic view of the gas recovery system of this invention.

In the drawing, referring particularly to FIG. 1, the letter S indicates generally the gas recovery system of this invention. The system illustrated in FIG. 1 includes a group of sampler vessels 10 and 10A. Two vessels are shown herein only to illustrate one embodiment of this invention; in actual practice, one or more sampler vessels may be used. A delivery line 11 connects each sampler vessel into a blower 12. A filter device 13 is also installed in the delivery line ahead of the blower. The filter prevents loose pellets, gravel, dust, and other contaminants, which can enter the system with incoming air, from plugging the blower.

Positioned between the blower 12 and the sampler vessels 10 is a product train 14, which is connected into the delivery line 11. The product train includes equipment for polymerizing the polyethylene resin, a pelletizer apparatus, and other equipment for converting the resin material to pellets and directing the pellets into the delivery line. The present system also includes a group of blender vessels, indicated by numerals 15, 15A, and 15B. Like the sampler vessels, the number of blender vessels used in this system is not critical; one or more may be used. The sampler vessels 10 and 10A are connected into the blender vessels by a transfer line 16.

The transfer line 16 also connects the blender vessels into a blower 17. Ahead of the blower, in line 16, is a filter device 18. The sampler vessels 10 and 10A, and blender vessels 15, 15A, and 15B, are connected into another blower 19 by a purge line 20. Fresh air from the surrounding atmosphere enters the blower 19 through a feeder line 21 that connects into an air inlet device 22. A filter device 23 and valve 24 are installed in line 21 between the air inlet and blower 19. Gases purged from the sampler vessels are carried into a furnace 25 through a vent line 26. A second vent line 27 carries the purged gases from the blender vessels into the vent line 26. The gas mixtures are directed into the furnace through a blower 28, installed in line 26 ahead of the furnace.

Figure 2:
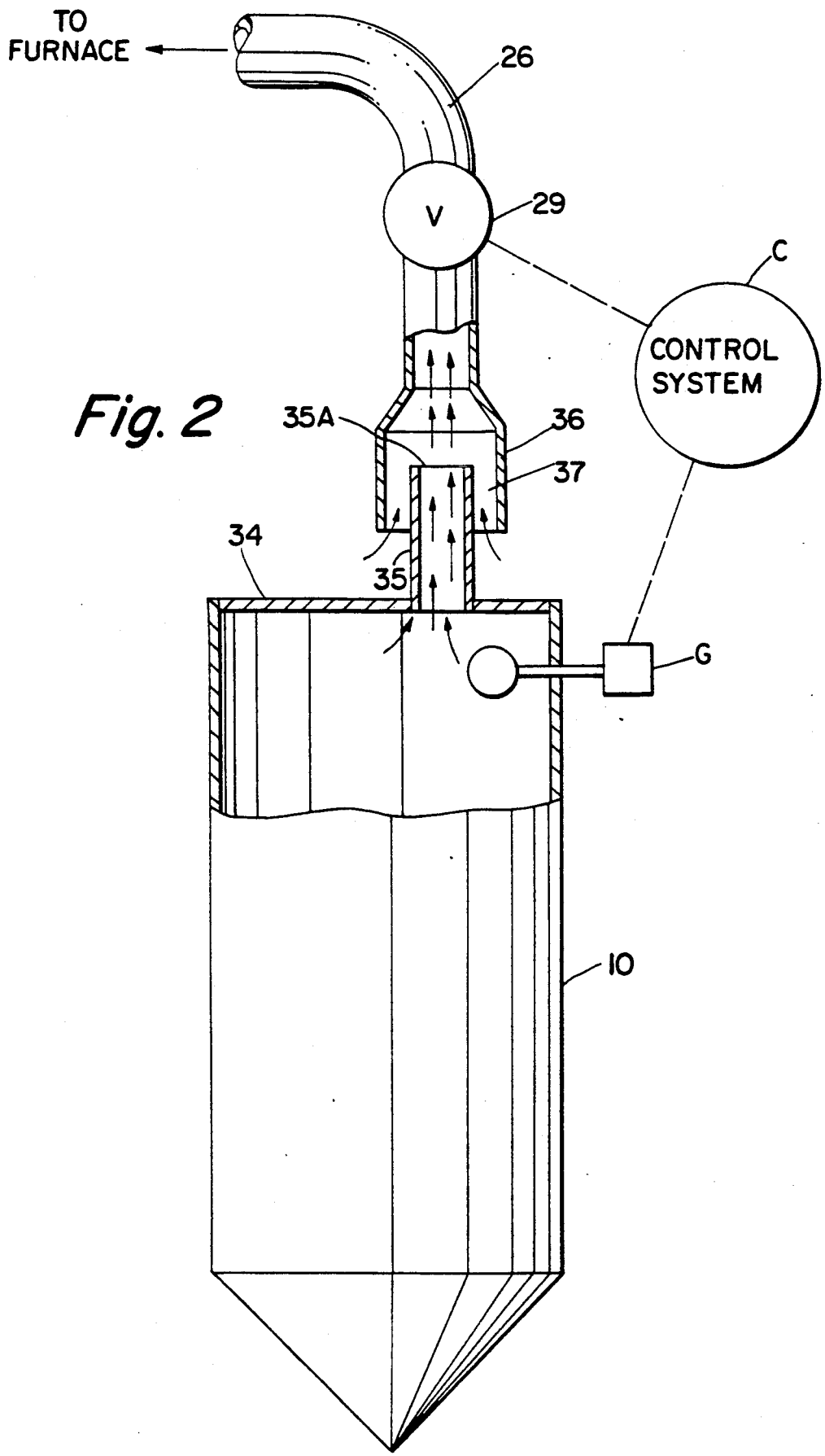
FIG. 2 is an enlarged view, mostly schematic, of one of the sampler or blender vessels in the gas recovery system shown in FIG. 1.

The present recovery system includes several vent control valves. As shown in FIG. 1, vent control valves 29 and 30 are installed in vent line 26 above the sampler vessels 10 and 10A; and similar valves 31, 32, and 33 are installed in vent line 27 above the blender vessels 15, 15A, and 15B. The recovery system also includes several flammable gas detector devices, indicated by the letter G. For example, as shown in FIG. 1, gas detector devices are installed in vent line 26. FIG. 2 is an enlarged view, in which the numeral 10 refers to either a sampler or a blender vessel. As shown in FIG. 2, a gas detector device G is also installed in each sampler or blender vessel.

The vent control valves and gas detectors are part of a control system that prevents gas concentration in the sampler or blender vessels from exceeding a safe level.

In FIGS. 1 and 2 the control system is indicated by the letter C. The broken lines in FIG. 1 (which are not numbered) indicate electronic connections from the control system to the vent control valves, the gas detectors, and valve 24 in feeder line 21.

Looking further at FIG. 2, the sampler and blender vessels have a closed top 34, with a vertical discharge pipe 35 therein. The open end of vent line 26 defines a hood section 36 that fits down over the upper end 35A of the discharge pipe. The larger diameter of the hood section provides an annular space 37 between the discharge pipe and the hood section. The cross-sectional area of space 37 is such that flow of any air will be into the hood section 36 from the atmosphere.

OPERATION

In one example of the practice of this invention, volatile organic gases emitted by the polyethylene product mentioned earlier are recovered. Part of the process for making this resin product will now be described to illustrate the invention. From the product train 14, blower 12 moves the resin pellets (not shown) through delivery line 11 into sampler vessel 10. When vessel 10 is full, the continuously moving stream of pellets in line 11 is diverted into the other sampler vessel 10A.

Samples are taken of the pellets in vessel 10 to analyze them for product quality. After sampling, blower 17 moves the pellets through transfer line 16 into the blender vessel 15. When the pellets reach a certain level in vessel 15, they are mixed together to obtain a uniform mixture. While this mixing operation is taking place, the pellet stream is diverted into blender vessel 15A. Blender vessel 15B also provides an extra vessel that can be used for the mixing operation if it's needed. As mixing is completed in each blender vessel, the pellets are transferred to rail cars, drums, or other containers for shipping or storage. This operation is not illustrated in the drawing.

Referring again to the operation described above, the actual sequence for moving the pellets through the system is to fill a sampler vessel with pellets, sample these pellets while another sampler vessel is filling, move the "sampled" pellets to a blender vessel, mix these pellets while another blender vessel is filling, and transfer the pellets from each blender vessel to shipping or storage containers.

The gas purging step in this operation is initiated by drawing outside air (purge air) through feeder line 21 into blower 19; in turn, the blower moves the air through purge line 20 into the blender vessels and sampler vessels. As the air moves upwardly through the sampler vessels 10 and 10A it mixes with the organic gases, and this mixture is directed into vent line 26. The air moving through the blender vessels 15, 15A, and 15B also mixes with the organic gases therein and the mixture is carried through vent line 27 into vent line 26. The gas mixture in line 26 is then drawn into furnace 25 by the blower 28.

Most of the purge air that moves through the sampler and blender vessels mixes with the organic gases and is directed into the furnace. But enough of this air recycles through the blowers 12 and 17 to enable the blowers to move (air convey) the pellets from the product train to the sampler vessels, and from the sampler vessels to the blender vessels. The mixture of air and organic gases provides combustion air for furnace 25, and the furnace itself provides heat for other operations in the polymerization and pellet-making process.

The control system C provides a safety feature in the practice of this invention. The gas detectors G have a concentration setting referred to as a lower explosive level (LEL). The detectors are set to control the system below the LEL. This setting is below the concentration at which the sampler and blender vessels could explode if an ignition source is present. If the gas detectors G sense a condition anywhere in the system that exceeds the LEL setting, the control system C responds by closing the vent control valves 29, 30, 31, 32, and 33, and opening valve 24 in feeder line 21. When the vent control valves are closed and valve 24 is opened, gas in the sampler and blender vessels can't enter the vent lines 26 and 27. Instead, gas in these vessels will move out of the discharge pipe 35, hit the closed valves in the vent lines, back up into the hood section 36, and be exhausted into the atmosphere through the annular space 37.

The operation described above illustrates how volatile organic gases can be recovered in a process for making a polyethylene resin. The recovery system of this invention would also be useful in recovering volatile gases generated by other compounds, such as low density polyethylene (LDPE), high density polyethylene (HDPE), polypropylene, and polystyrene. The volatile gases generated in the process described herein depend on the solvent carrier used in the process. For example, such gases include ethylene, propylene, butane, hexene, octane, ethane, propane, butane, isopentane, hexane, isooctane, trimethylpentane, and styrene.

The invention claimed is:

1. An apparatus for handling substances which emit flammable materials which is designed to reduce emissions to the atmosphere of the flammable materials which comprises:
   a vessel;
   the vessel having means for venting its gas mixture to the atmosphere, said means for venting having an essentially perpetually open conduit between the flammable materials and the atmosphere;
   means for air purging of the vessel;
   a conduit means having an opening which communicates with the venting means of the vessel to draw the gas mixture from the venting means of the vessel to a gas mixture treatment means, said conduit means having valve means to permit said gas mixture from the venting means of the vessel to be alternatively released to the atmosphere;
   means for detecting the composition of the gas mixture in the apparatus prior to the gas mixture treatment means;
   a control means operably connected to the valve means in the conduit means and to the means for detecting the composition of the gas mixture;
   wherein, the valve means is operated by the control means to assist in maintaining the composition of the gas mixture in the conduit means outside of the explosive range.

2. The apparatus of claim 1 wherein the conduit means communicates with the venting means through a hood means positioned above the venting means whereby the hood means is positioned to deflect atmospheric currents from impinging on the atmospheric outlet from the venting means and affords sufficient opening to the atmosphere to permit effective venting.

3. The apparatus of claim 1 further comprising a blower means to assist in conveying the gas mixture from the vessel to the gas treatment means.

4. The apparatus of claim 3 wherein the treatment means communicates with more than one conduit means and each conduit means communicates with one or more vessels.

5. The apparatus of claim 4 wherein said each of said conduit means has a valve means to permit said gas mixture from the venting means of the vessel to be alternatively released to the atmosphere.

6. The apparatus of claim 1 wherein the treatment means communicates with more than one conduit means and each conduit means communicates with one or more vessels.

7. The apparatus of claim 6 wherein said each of said conduit means has a valve means to permit said gas mixture from the venting means of the vessel to be alternatively released to the atmosphere.

8. A method for reducing emissions from a substance emitting flammable materials, comprising the steps of:

conveying the substance to a vessel having an essentially perpetually open conduit between the flammable materials and the atmosphere;

blowing purge air into the vessel;

mixing the air with the flammable materials emitting from the substance into a gas mixture;

carrying the gas mixture out of the vessel and into a treatment means;

detecting the composition of the flammable materials in the gas mixture;

comparing the composition of the flammable materials in the gas mixture to compositional values which define the explosive range for the gas mixture;

venting the gas mixture to the atmosphere when the composition of the gas mixture is in the explosive range.

9. The method of claim 8 in which the flammable materials are hydrocarbon gas compounds selected from the group consisting of ethylene, propylene, butene, hexene, octene, ethane, propane, butane, isopentane, hexane, isooctane, trimethylpentane and styrene.

* * * * *